(12) United States Patent
Kawakami (10) Patent No.: US 7,777,444 B2
(45) Date of Patent: Aug. 17, 2010

(54) TRAVEL-DRIVING MECHANISM FOR SELF-PROPELLED WORKING MACHINE

(75) Inventor: Toshiaki Kawakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 11/751,943

(22) Filed: May 22, 2007

(65) Prior Publication Data

US 2007/0272510 A1 Nov. 29, 2007

(30) Foreign Application Priority Data

May 24, 2006 (JP) .............................. 2006-144082

(51) Int. Cl.
*H02P 3/18* (2006.01)
(52) U.S. Cl. ....................... 318/822; 318/528; 318/362; 318/375
(58) Field of Classification Search ................... 56/10.1; 180/214–220, 244, 279, 445, 54.1, 336, 337, 180/65.1, 65.2, 65.31; 318/9, 140, 375, 400.01, 318/430, 434, 689, 703, 727, 779, 244, 362, 318/528, 800, 822; 212/170
See application file for complete search history.

(56) References Cited

U.S. PATENT DOCUMENTS 4,909,365 A 3/1990 Tillotson et al.
(Continued)

FOREIGN PATENT DOCUMENTS

DE 1 931 198 12/1970
EP 1 526 300 4/2005
JP 62-2338 Y2 1/1987
JP 2005-127448 A 5/2005

OTHER PUBLICATIONS

European Office Action dated Sep. 24, 2007, Application No. 07 010 392.4-2313.

*Primary Examiner*—Bentsu Ro
*Assistant Examiner*—Antony M Paul
(74) *Attorney, Agent, or Firm*—Westerman, Hattori, Daniels & Adrian, LLP (57) ABSTRACT

In a travel-driving mechanism for a self-propelled working machine such as a self-propelled lawn mower travels by using power of an electric motor 30, the torque of a driving shaft 50, which is driven by the power of the electric motor 30 through a power transmission unit 40, is transmitted to travel-driving wheels 7 through two-way or bi-directional clutches 55 provided at both ends of the driving shaft 50. Power transmission units 61, 62 are provided between the bi-directional clutch 55 and the driving wheels 7. A travel control unit 70 is provided to input an instruction signal produced by the operation of a travel operation member 66, which is operated by the operator, and to control the electric motor 30. When a travel stop signal produced by the operation of the travel operation member 86 is input to the travel control unit 70, short-circuit stop (short-circuit braking) occurs while electric power is being supplied to the electric motor 30, and the driving shaft 50 connected to the electric motor 30 stops. Since the travel driving wheels 7 rotate due to inertia, the bi-directional clutches 55 are brought into disengaged state. The operator can thus easily pull and push the working machine after the travel by the driving source or after the stop thereof, by using a simple structure in which the bi-directional clutch is used for transmitting travel power.

4 Claims, 10 Drawing Sheets

U.S. PATENT DOCUMENTS

| | | | |
|---|---|---|---|
| 5,119,632 A * | 6/1992 | Nishimura et al. | 60/487 |
| 5,316,097 A * | 5/1994 | Meyer et al. | 180/19.1 |
| 5,518,461 A * | 5/1996 | Pfordt | 475/72 |
| 5,697,466 A * | 12/1997 | Moroto et al. | 180/65.25 |
| 5,998,901 A * | 12/1999 | Kawabata et al. | 310/114 |
| 6,332,506 B1 * | 12/2001 | Kifuku | 180/443 |
| 6,354,414 B1 * | 3/2002 | Sueshige et al. | 192/45 |
| 6,374,791 B1 * | 4/2002 | Kuwabara et al. | 123/179.25 |
| 6,658,829 B2 * | 12/2003 | Kobayashi et al. | 56/10.5 |
| 6,756,750 B2 * | 6/2004 | Wakitani et al. | 318/54 |
| 7,073,648 B2 * | 7/2006 | Ishikawa et al. | 192/43.1 |
| 7,095,196 B2 * | 8/2006 | Tokunou et al. | 318/375 |
| 7,166,049 B2 * | 1/2007 | Saller | 475/5 |
| 7,262,579 B1 * | 8/2007 | Shepard | 318/810 |
| 7,328,762 B2 * | 2/2008 | Kanke et al. | 180/19.3 |
| 2002/0185353 A1 | 12/2002 | Ballew et al. | |
| 2003/0037525 A1 | 2/2003 | Iida et al. | |
| 2004/0162187 A1 * | 8/2004 | Suzuki | 477/182 |

* cited by examiner

TRAVEL-DRIVING MECHANISM FOR SELF-PROPELLED WORKING MACHINE

BACKGROUND OF THE INVENTION

1. Field of the Invention

The present invention relates to a travel-driving mechanism for a self-propelled working machine such as a lawn mower, which travels by using power of a driving source.

2. Description of the Related Art

A self-propelled working machine such as a lawn mower, which travels by using power of a driving source is a working machine, which is moved by pushing or pulling by the operator and is turned to change the direction thereof after the travel of the working machine by the driving source is stopped. A clutch is provided in a unit for transmitting travel power. When the operator moves the working machine, the clutch is disengaged to make easy the pushing or pulling by the operator.

A clutch mechanism, which is disengaged irrespective of the direction of power transmission, should have an actuator for allowing the clutch to be engaged or disengaged. The actuator increases the manufacturing cost of the clutch mechanism. For this reason, a simple one-way or one-directional clutch has been generally used (for example, refer to JP-UM-B-62-2338).

In the case of the one-way or one-directional clutch, when the working machine stops after travel by a driving source, the one-directional clutch is in the engaged state. Thus, when the working machine is to be pulled rearward, the driving shaft of the driving source rotates due to the backward rotation of the driving wheels in the engaged state of the clutch. For this reason, the operator must move the working machine under the large load. Thus, disengaging operation of the clutch needs to be performed to solve the problem.

A machine having a two-way or bi-directional clutch has been proposed, which is provided with a unit for transmitting travel power (refer to JP-A-2005-127448).

The two-way or bi-directional clutch is a clutch in which only forward directional power of the driving shaft of the driving source is transmitted to the driving wheels and the forward and backward torque of the driving wheels is not transmitted to the driving shaft if the clutch is not engaged.

In the case of the bi-directional clutch, when a machine stops after travel by a driving source, the driving wheels are disconnected from the driving shaft and are free if the clutch is not engaged. Accordingly, it is possible for the operator to easily move the working machine forward and backward. However, when the machine stops after travel by the driving source, the driving shaft stops but the driving wheels rotate due to inertia and the torque of the driving wheels causes the driving shaft to rotate without disengagement of the clutch. In this case, when the working machine is pulled rearward after the stop, it is difficult for the operator to move the machine under the large load caused by the engaged state of the clutch.

SUMMARY OF THE INVENTION

The invention has been made to solve the above problems, and it is an object of the invention to provide a travel-driving mechanism for a self-propelled working machine, which can be pulled and pushed after the travel by a driving source or after the stop thereof, by using simple structure in which a bi-directional clutch is used as a unit for transmitting travel power.

In order to achieve the object, the present invention provides a travel-driving mechanism for a self-propelled working machine, wherein a driving wheel is rotated by using power of an electric motor for travel, wherein the mechanism comprises: a power transmission unit provided between the electric motor and the driving wheel and including a bi-directional clutch; and a travel control unit that receives an instruction signal produced by operation of a travel operation means, which is operated by an operator, as input and controls the electric motor, and wherein the travel control unit is operable to cause a short-circuit stop of the electric motor while electric power is being supplied to the electric motor upon receiving a travel stop signal produced by operation of the travel operation means.

In the travel-driving mechanism for a self-propelled working machine according to the invention, when the travel stop signal produced by the operation of the travel operation member is input to the travel control unit, the travel control unit stops the operation of the electric motor while electric power is being supplied to the electric motor. This means that the electric motor is instantaneously stopped due to short-circuit stop. Accordingly, since the driving shaft stops while the rotation of the driving shaft is limited, the bi-directional clutch is reliably disengaged before the driving wheels stops after rotating due to inertia following the stop of the driving shaft. As a result, the operator can easily push and pull the working machine thereafter.

DESCRIPTION OF THE PREFERRED EMBODIMENTS

An embodiment of the invention will be described below with reference to FIGS. 1 to 12.

A working machine according to this embodiment is a lawn mower 1. That is, the working machine is a hybrid self-propelled lawn mower that can rotate mowing blades 12 (see FIG. 2) by a four-stroke cycle internal combustion engine 10 to perform a mowing operation and can travel for oneself by a travel DC motor 30.

Figure 1:
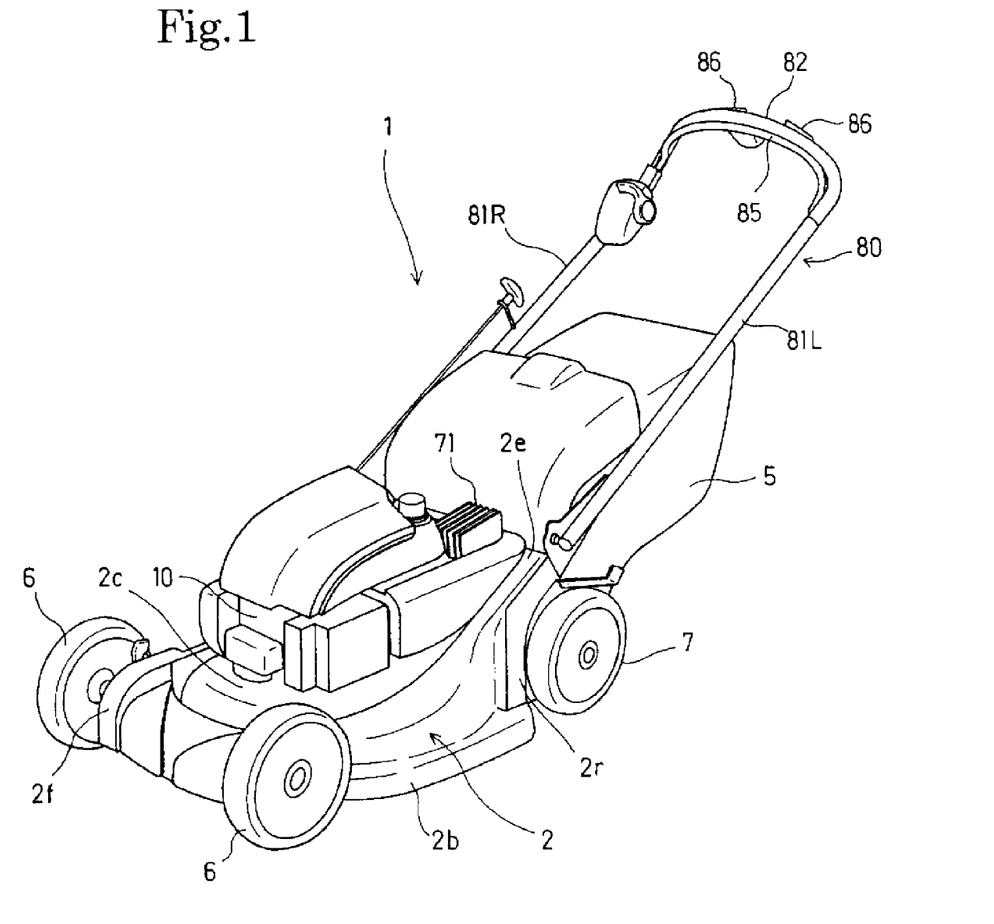
FIG. 1 is a perspective view showing an entire lawn mower, which is an example of a self-propelled working machine according to an embodiment of the invention.
Figure 2:
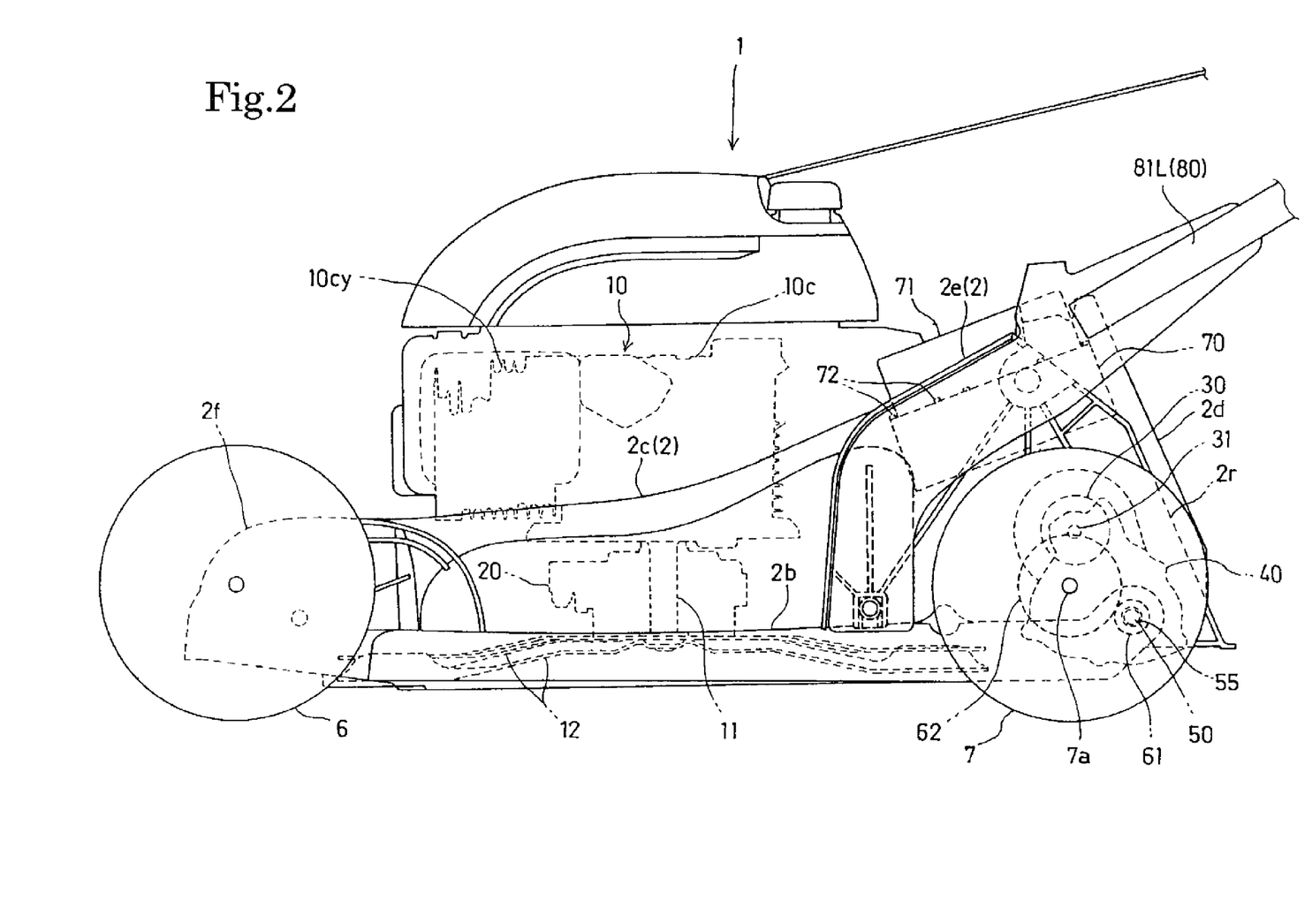
FIG. 2 is a side view of a body of the lawn mower.
Figure 3:
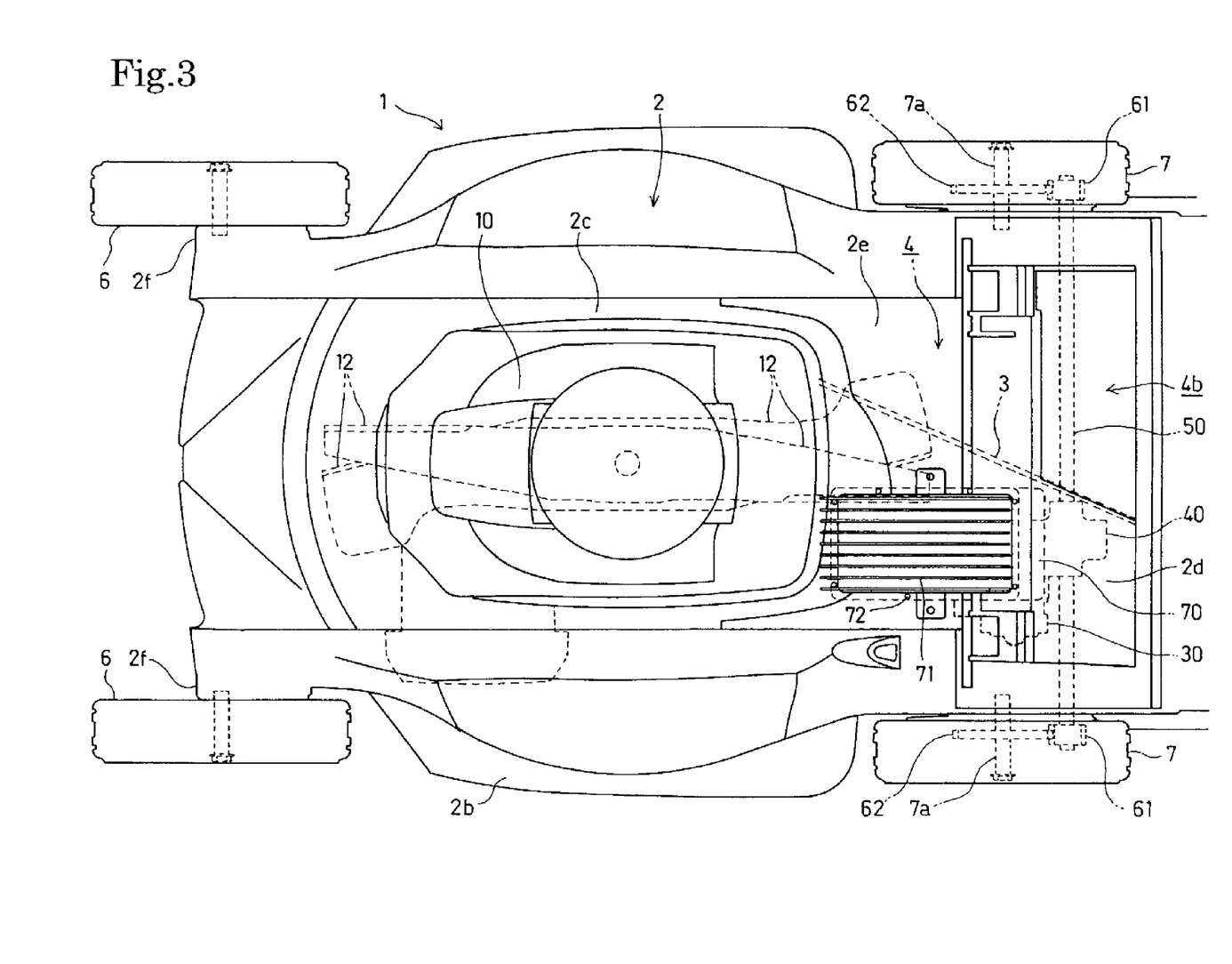
FIG. 3 is a plan view of the body of the lawn mower.
Figure 4:
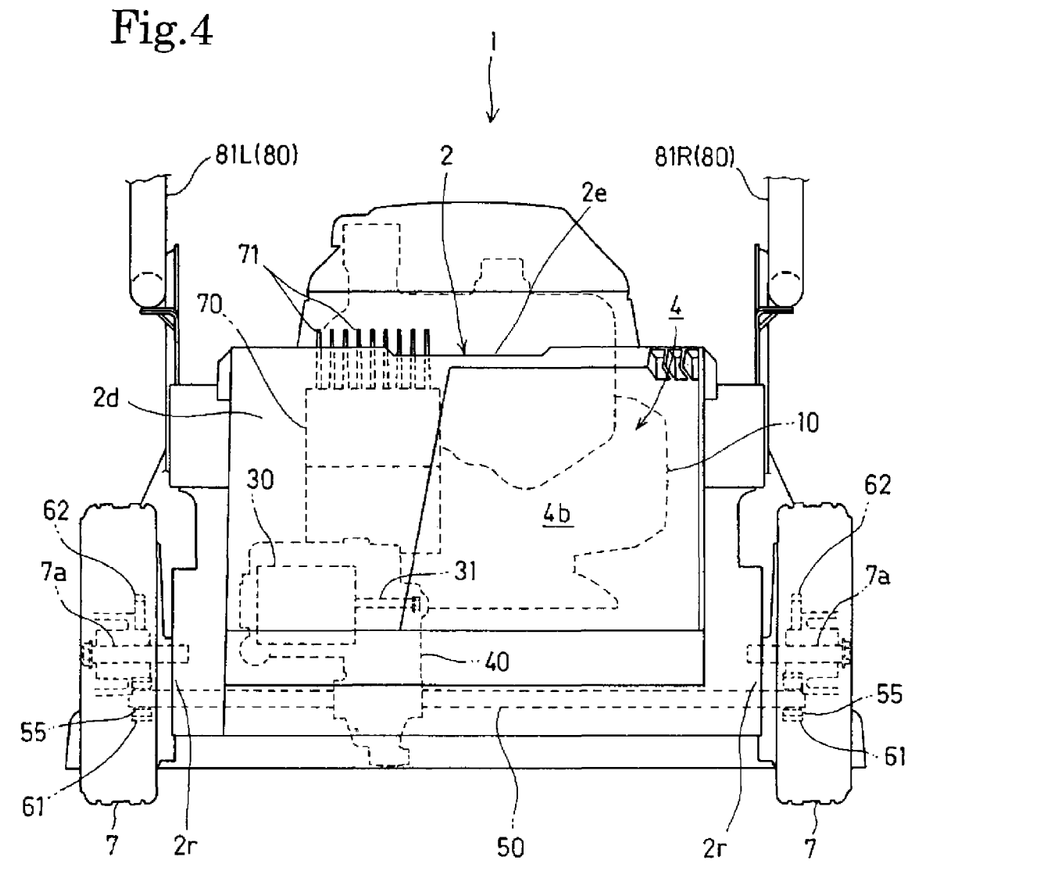
FIG. 4 is a rear view of the body of the lawn mower.

FIG. 1 shows a perspective view showing the entire lawn mower 1, FIG. 2 shows a side view of a body of the lawn mower, FIG. 3 is a plan view of the body of the lawn mower, and FIG. 4 is a rear view of the body of the lawn mower.

Referring to FIG. 1, a blade housing 2, which supports the mowing blades 12 (see FIG. 2) rotating above the ground and covers the blades from above, is supported by a pair of (left and right) front wheels 6 and 6 and rear wheels 7 and 7 so as to freely travel on the ground.

A direction in which the lawn mower 1 moves forward will be referred as a forward direction in the description, and the front, the rear, the left, and the right are determined on the basis of the above-mentioned direction.

Bearing portions 2f, 2f, 2r, and 2r, which support four shafts of the front and rear wheels 6, 6, 7, and 7, are provided at four corners of the blade housing 2. Further, the lower portion of a central portion 2c, which is surrounded by the bearing portions 2f, 2f, 2r, and 2r, of the blade housing 2 is formed to have the shape of a flat bowl, thereby forming a blade receiving portion 2b covering the blades 12. The rear half portion of the central portion 2c is expanded upward toward the rear side thereof, thereby forming an expansion portion 2e that is continuous to the rear side and expanded upward.

An internal combustion engine 10 is provided in the central portion 2c of the blade housing 2 so that a crankshaft 11 (see FIG. 2) is oriented in a vertical direction. In the internal combustion engine 10, cylinders 10cy are oriented toward the front side, and the crankshaft 11 protrudes downward from within a crank case 10c.

Figure 5:
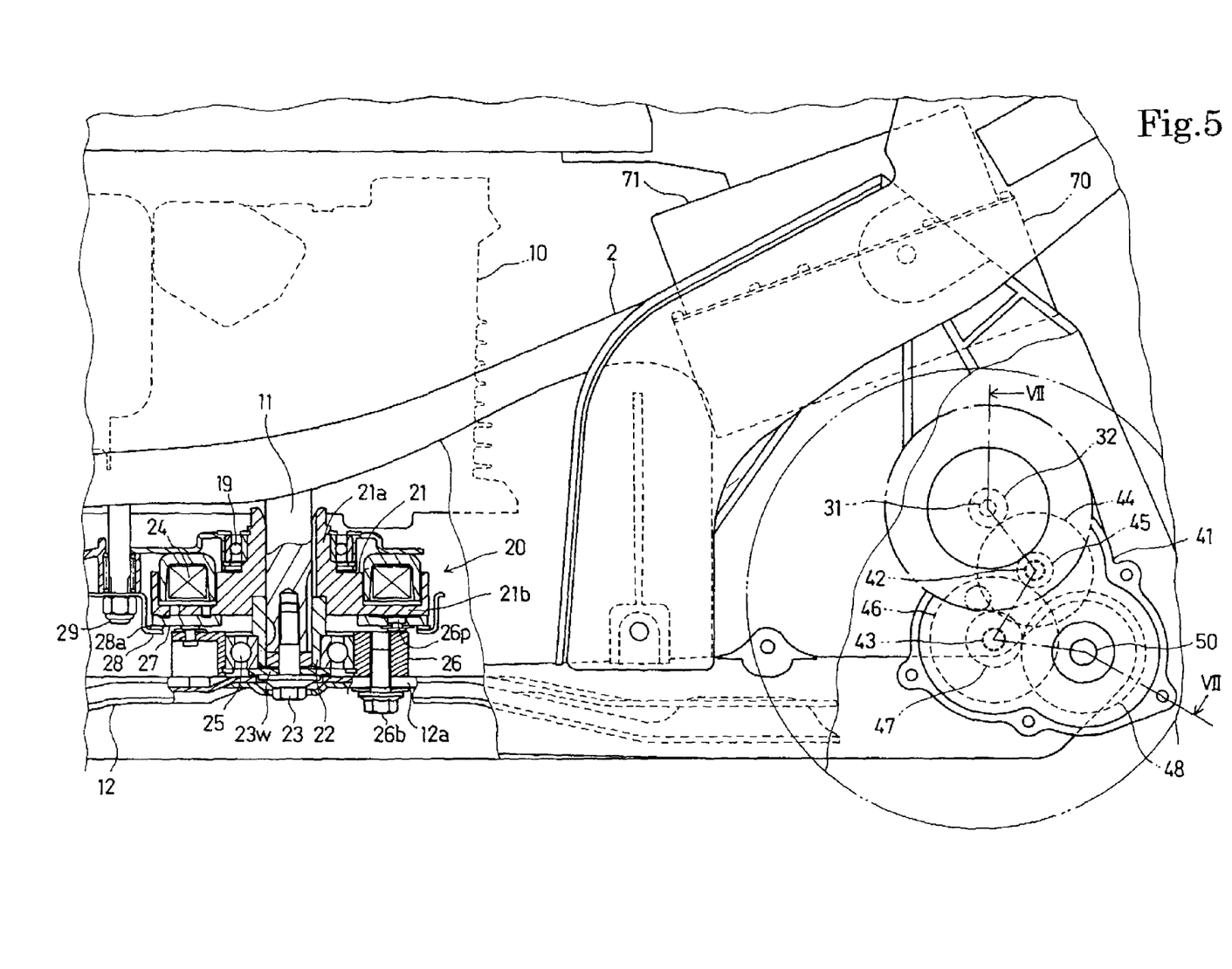
FIG. 5 is a side view, partly in section, of the lawn mower in which a part of the lawn mower is omitted.

As shown in FIG. 5, an electromagnetic clutch 20 is provided between the crankshaft 11 and the blades 12. Accordingly, if the electromagnetic clutch 20 is engaged during the operation of the internal combustion engine 10, the blades 12 are rotated. As a result, it is possible to perform the mowing operation.

A vertical partition plate 3 (see FIG. 3) is obliquely provided throughout from the right side of the central portion 2c to the expansion portion 2e at the posterior half of the blade housing 2. Further, the inside of the blade housing 2 is partitioned by the vertical partition plate 3, so that a lawn conveying passage 4 is formed.

The lawn conveying passage 4 is a passage, which is formed by partitioning the inside of the blade housing 2. The front end of the passage is opened to the blade receiving portion 2b, and the cross-sectional area of the passage is gradually increased from a front opening toward the rear side thereof. For this reason, a large rear opening 4b (see FIGS. 3 and 4) is formed in the rear wall, which is slightly inclined, of the expansion portion 2e.

The rear opening 4b of the lawn conveying passage 4 is largely opened to occupy an area larger than the right half portion of the rear wall 2d of the expansion portion 2e, and the front opening is connected to the rear opening 4b. A lawn collecting bag 5 shown in FIG. 1 is connected to the rear opening 4b to extend toward the rear.

The inside of the blade housing 2 is partitioned by the inclined vertical partition plate 3, so that the lawn conveying passage 4 is formed at the right portion in the blade housing. Further, a travel DC motor 30 and a speed reduction mechanism 40 are provided in a lower half of a left-side space, which is partitioned by the vertical partition plate 3.

As shown in FIG. 4, a motor driving shaft 31 of the travel DC motor 30 is disposed in the upper portion of the speed reduction mechanism 40, as an input shaft of the speed reduction mechanism 40. Further, the torque of the motor driving shaft 31 is transmitted to a driving shaft 50, which serves as an output shaft provided in the lower portion of the speed reduction mechanism 40, through the engagement of reduction gears at a reduced speed.

Figure 6:
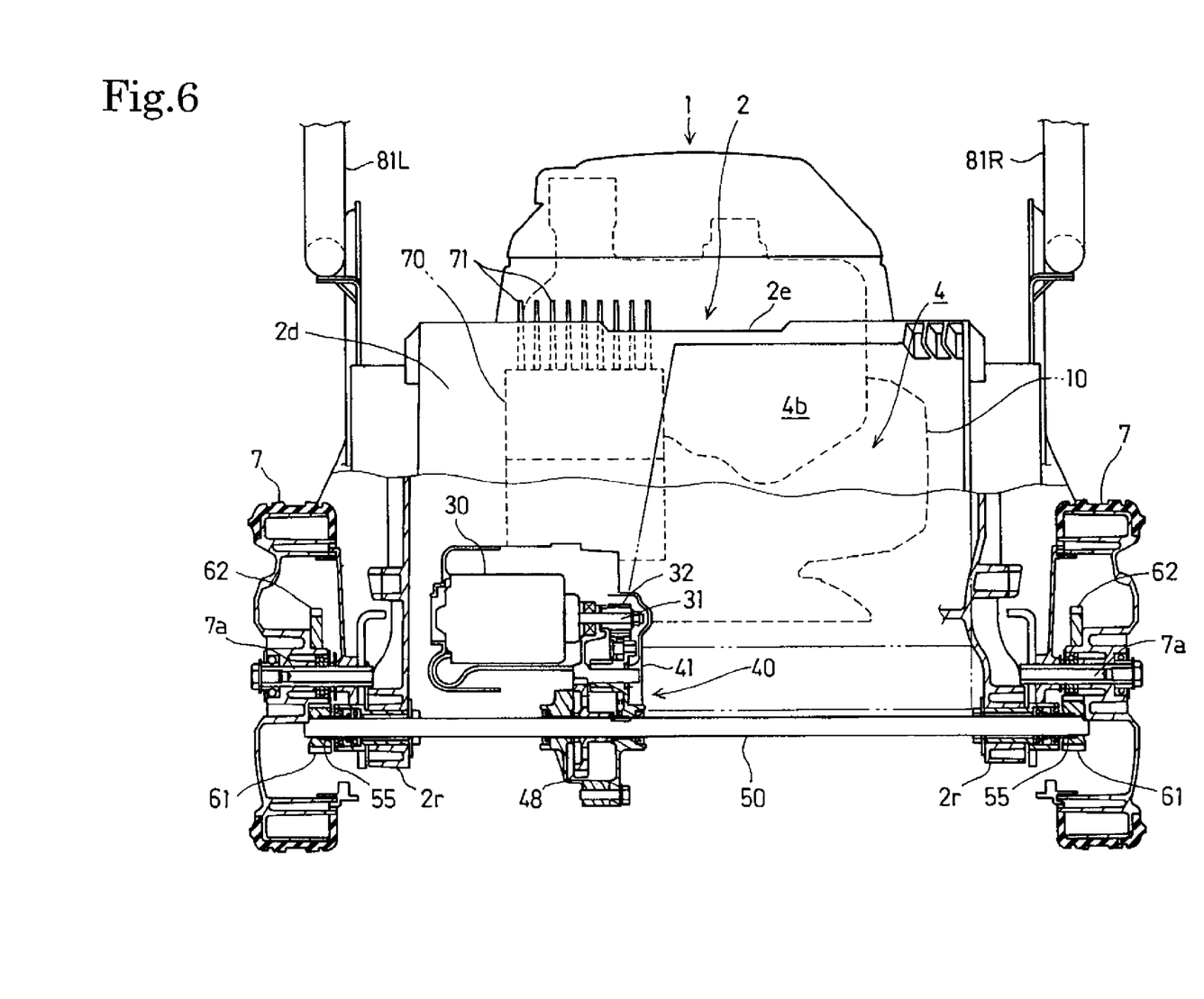
FIG. 6 is a rear view, partly in section, of the lawn mower in which a part of the lawn mower is omitted.

As shown in FIGS. 4 and 6, the driving shaft 50 extends in the left-and-right or transverse direction and is rotatably provided on the rear side of rear axles 7a and 7a by which the rear wheels 7 and 7 are rotatably supported. Further, driving gears 61 and 61, which are fitted to both ends of the driving shaft 50 with two-way or bi-directional clutches 55 interposed therebetween, are engaged with driven gears 62 and 62, which are integrally fixed to the rear wheels 7 and 7.

Accordingly, the torque of the motor driving shaft 31 of the travel DC motor 30 is transmitted to the driving shaft 50 through the speed reduction mechanism 40 at a reduced speed, and the torque of the driving shaft 50 is transmitted to the rear wheels 7 and 7 through the two-way or bi-directional clutches 55 and the engagement between the driving and driven gears 61, 61, 62, and 62. Therefore, the lawn mower 1 travels. The two-way or bi-directional clutches 55 will be described later.

The drive control of the travel DC motor 30, the operational control of the internal combustion engine 10, and the engagement or disengagement control of the electromagnetic clutch 20, which transmits the power of the internal combustion engine 10 to the blades 12, are performed by an ECU 70 (see FIGS. 2 and 4), which is an electronic control unit using a computer.

The ECU 70 is provided in an upper half of the left space of the lawn conveying passage 4, which left space is partitioned by the vertical partition plate 3 at the upper portion of the rear expansion portion 2e of the blade housing 2. The travel DC motor 30 is provided on the lower side of the ECU 70. The ECU 70 is received in a case having a rectangular parallelepiped shape, and a plurality of cooling fins 71 protrude in line from the upper surface of the case.

An inclined upper wall of the rear expansion portion 2e of the blade housing 2 is partially opened so that a rectangular opening is formed, and the rectangular opening is slightly smaller than the rectangular upper surface of the case of the ECU 70. As shown in FIG. 3, the cooling fins 71 are inserted into the rectangular opening from below so as to be exposed to the upper side. Further, the outer edges of the upper surface of the case of the ECU 70 come in contact with the edges of the rectangular opening, and are fixed to the edges of the rectangular opening with screws 72. Accordingly, the ECU 70 is supported on the upper wall of the blade housing 2.

The ECU 70, which is attached to the rear expansion portion 2e of the blade housing 2 in this way, is provided on the rear side at a position spaced apart from the internal combustion engine 10 toward the rear side as shown in FIG. 2. Further, the body of the ECU 70 is positioned below the level of the upper end of the internal combustion engine 10.

An operation handle 80 extends rearward from the upper portion of the rear expansion portion 2e of the blade housing 2. The operation handle 80 is a member, which is obtained by bending a tubular member in a U shape. Left and right long handgrips 81L and 81R extend rearward from the left and right sides of the rear expansion portion 2e of the blade housing 2 so as to slightly ascend, and the rear ends of the handgrips are connected to each other through a grip part 82, thereby forming the operation handle 80.

The operation handle 80 is provided with operation members such as a blade lever 85 and a travel lever 86. Accordingly, the operator controls the lawn mower 1 while gripping the grip part 82 of the operation handle 80 and operates the blade lever 85 and the travel lever 86.

Figure 11:
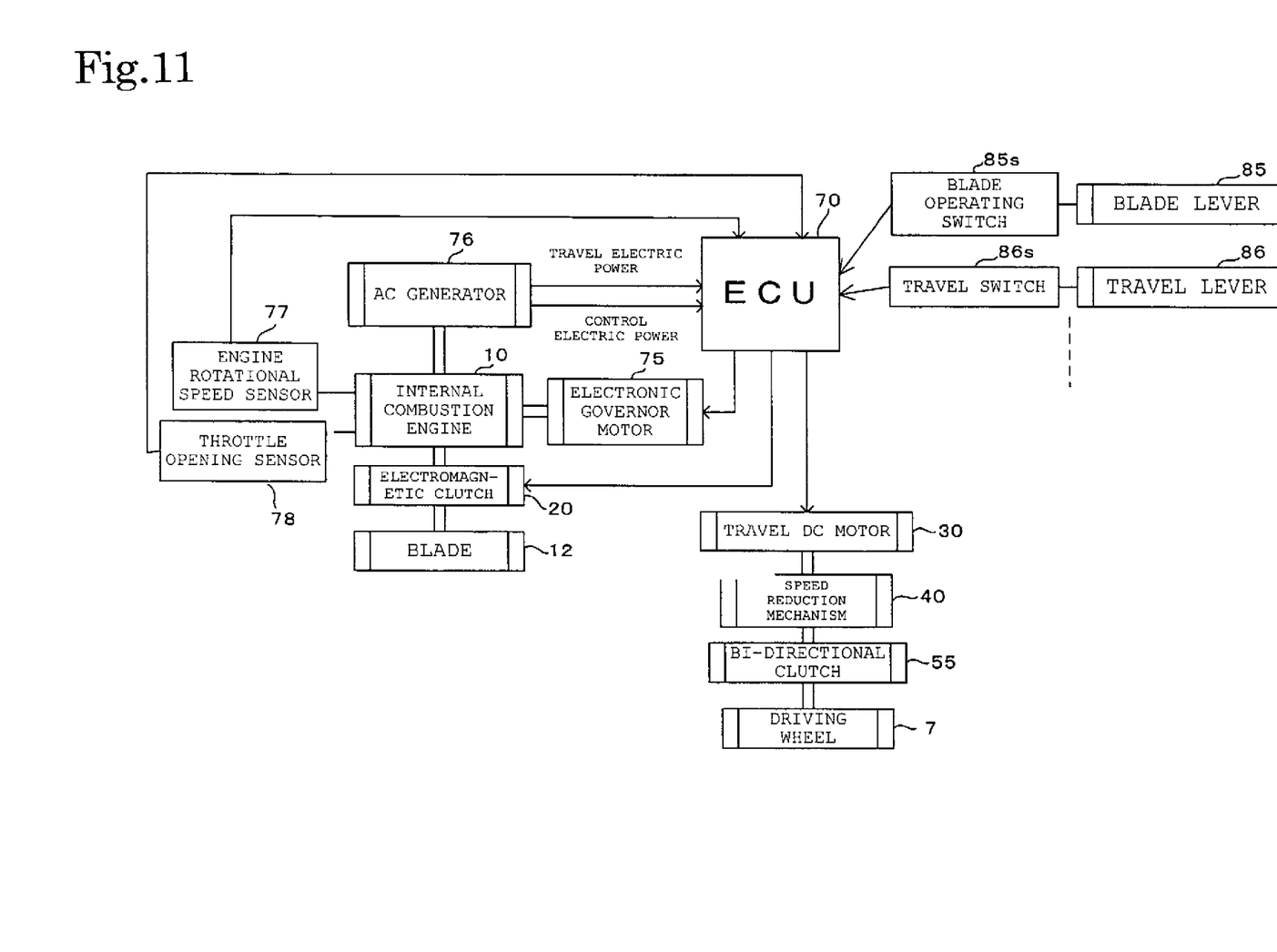
FIG. 11 is a schematic block diagram of a control system of the lawn mower.

A schematic block diagram of a control system of the lawn mower 1 is shown in FIG. 11.

The internal combustion engine 10 is provided with an electronic governor mechanism for controlling the engine rotational speed, and the ECU 70 controls an electronic governor motor 75 for driving a throttle valve of the internal combustion engine 10. In addition, the ECU 70 controls the operation of the electromagnetic clutch 20 and the travel DC motor 30.

The internal combustion engine 10 is provided with an AC generator 76, which generates current by using the rotation of the crankshaft 11. Travel electric power of electric power generated by the AC generator 76 is supplied to the travel DC motor 30, so that the lawn mower travels. Further, electric power for control is supplied to the control system such as the electronic governor motor 75 and the ECU 70.

The ECU 70 is provided with an engine rotational speed sensor 77, which detects the rotation of the internal combustion engine 10, and a throttle opening sensor 78 in order to control the operation of the internal combustion engine 10 and the travel DC motor 30. Data signals of the engine rotational speed detected by the engine rotational speed sensor 77 and the throttle opening detected by the throttle opening sensor 78 are input to the ECU 70.

Operation signals of a blade operating switch 85s and a travel switch 86s, which are operated by the blade lever 85 and the travel lever 86, are input to the ECU 70 and processed. Then, the operation signals are used in the operation control of the travel DC motor 30 and an electromagnetic coil 24 (see FIG. 5) of the electromagnetic clutch 20. As a result, the mowing operation and travel driving are controlled.

The lawn mower 1 has the above-mentioned structure, and a power transmission system will be described below with reference to FIGS. 5 to 10.

First, the structure of the electromagnetic clutch 20, which transmits the power of the internal combustion engine 10 to the blade 12, will be described with reference to the sectional view of FIG. 5.

A rotary disk 21 is serration-fitted from below to the crankshaft 11, which protrudes downward from the internal combustion engine 10. In addition, a cylindrical collar 22 is fitted to the crankshaft 11 and then integrally fixed to the crankshaft 11 by using a flange bolt 23 with a washer 23w interposed therebetween. Accordingly, the crankshaft 11 and the rotary disk 21 rotate as a single body.

The rotary disk 21 is composed of a cylindrical portion 21a supported by a bearing 19 and a disk portion 21b formed at the lower end of the cylindrical portion. Further, the upper portion of an annular electromagnetic coil 24 is held, so that an annular electromagnetic coil 24 is suspended close to the upper surface of the disk portion 21b.

An annular blade supporting member 26 is provided on the outer peripheral surface of the collar 22 with a bearing 25 interposed therebetween so as to freely rotate relative to the crankshaft 11. Further, an annular base end 12a of the blades 12 comes in contact with the lower surface of the annular supporting member 26, and integrally fixed to the lower surface with a flange bolt 26b. Therefore, the blades 12 are supported to freely rotate with respect to the crankshaft 11.

A hollow disk-shaped clutch disk 27 is supported on the blade supporting member 26 so as to move up and down. That is, a plurality of pins 26p, which stands on the upper surface of the blade supporting member 26, passes through the clutch disk 27. The clutch disk 27 moves up and down with respect to the blade supporting member 26, but has the structure in which the rotation of the clutch disk 27 with respect to the blade supporting member 26 is limited.

The clutch disk 27 is close to the disk portion 21b of the rotary disk 21 and faces the disk portion. When moved upward, the clutch disk 27 comes in contact with the disk portion 21b. A friction member is attached to the portion, which comes in contact with the disk portion 21b of the rotary disk 21, of the upper surface of the clutch disk 27.

Further, an annular locking plate 28, which is fixed to the blade housing 2 with a bolt 29, is supported below the outer edge of the lower surface of the clutch disk 27. Friction members 28a are attached in an annular shape on the upper surface of the annular locking plate 28.

The electromagnetic clutch 20 has the above-mentioned structure. When current is not supplied to the electromagnetic coil 24 and the electromagnetic coil is demagnetized, the clutch disk 27 moves downward to be separated from the rotary disk 21. For this reason, although the crankshaft 11 and the rotary disk 21 rotate due to the driving of the internal combustion engine 10, power is not transmitted to the blade supporting member 26 and the blades 12 thus do not rotate.

Meanwhile, when current is supplied to the electromagnetic coil 24 and the electromagnetic coil is energized, the clutch disk 27 moves upward to be attached to the rotary disk 21 due to the magnetic force. For this reason, the torque of the crankshaft 11 causes the rotary disk 21 and the clutch disk 27 to rotate as a single body, and the torque of the clutch disk 27 is transmitted to the blade supporting member 26 through the pins 26p. Therefore, the blades 12 rotate.

In this case, when the electromagnetic coil 24 is deenergized, the clutch disk 27 is separated from the rotary disk 21 and moves downward to be placed on the friction members 28a of the annular locking plate 28. For this reason, the rotation of the clutch disk 27 and the blade 12 is limited due to inertia, so that the clutch disk 27 and the blades 12 stop.

Next, a travel driving system using the travel DC motor 30 will be described with reference to FIGS. 5 to 10.

Figure 7:
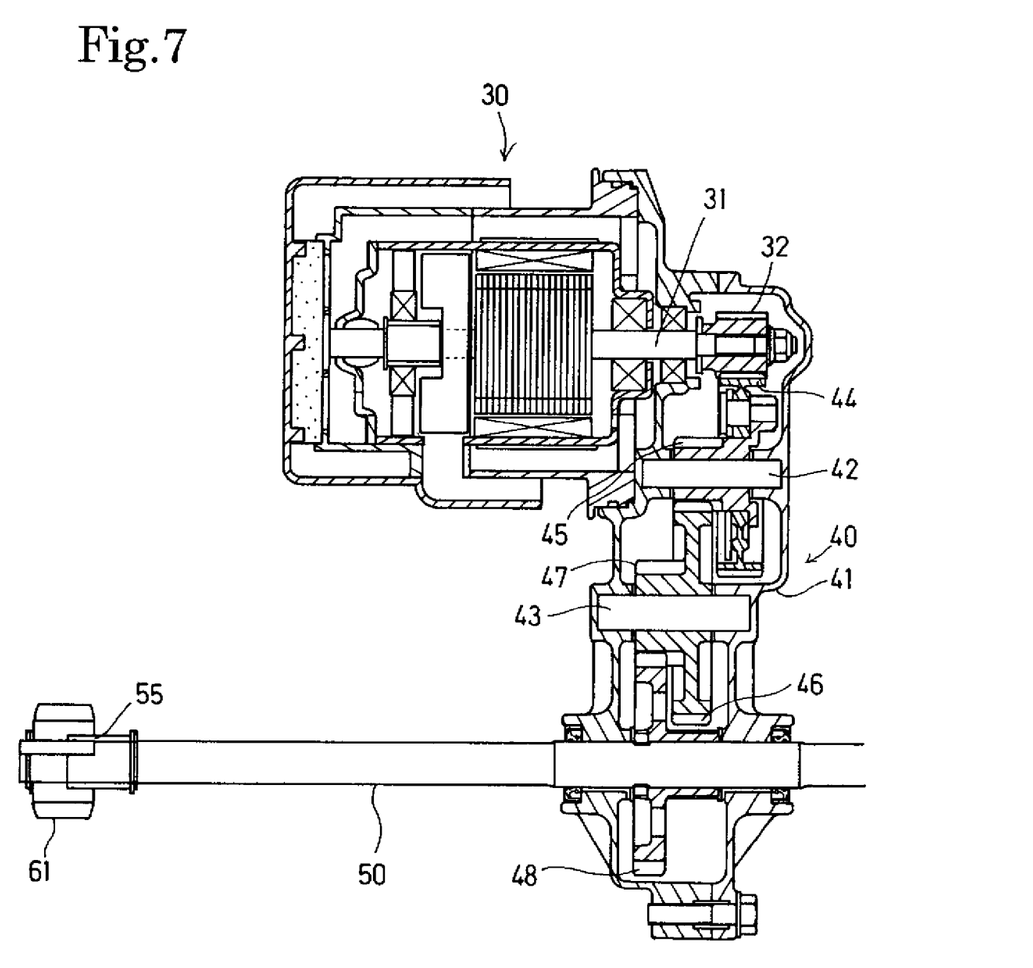
FIG. 7 is a sectional view of a travel DC motor and a speed reduction mechanism, taken along line VII-VII in FIG. 5.

As described above, the travel DC motor 30 and the speed reduction mechanism 40 are provided in the lower half of the left space, which is partitioned by the vertical partition plate 3, in the rear expansion portion 2e of the blade housing 2. Further, as shown in FIG. 7, the motor driving shaft 31 protruding from the right side of the travel DC motor 30 is inserted into the upper portion of a reduction gear case 41, and a motor driving gear 32 is fitted to the end of the motor driving shaft 31.

The driving shaft 50 passes through the lower portion of the reduction gear case 41 in a right-and-left or transverse direction. Further, two gear shafts 42 and 43 are provided between the motor driving shaft 31 and the driving shaft 50 in the reduction gear case 41. The gear shafts 42 and 43 are oriented in the right-and-left direction.

A large diameter gear 44, which is integrally fitted to a small diameter gear 45 rotatably supported by the gear shaft 42, is engaged with the driving gear 32.

A large diameter gear 46 and a small diameter 47, which are integrally formed with each other, are rotatably supported by the gear shaft 43. Further, the large diameter gear 46 is engaged with the small diameter gear 45, and the small diameter 47 is engaged with the large diameter gear 48 fitted to the driving gear 50.

The speed reduction mechanism 40 has the above-mentioned structure. The torque of the motor driving shaft 31 is transmitted to the driving shaft 50 at a reduced speed through the engagement of gears provided between the small diameter gear and the large gear.

The driving gears 61 and 61 are fitted to the both ends of the driving shaft 50 with the two-way or bi-directional clutches 55 and 55 interposed therebetween, and the driving gears 61 and 61 are engaged with the driven gears 62 and 62, which are integrally fixed to the rear wheels 7 and 7, respectively.

Figure 8:
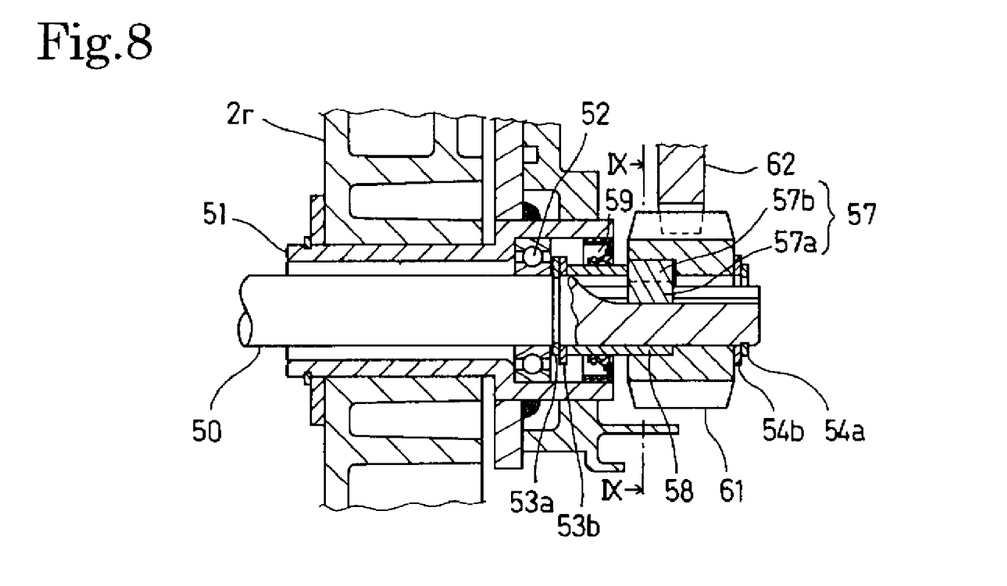
FIG. 8 is a sectional view of a two-way or bi-directional clutch.
Figure 9:
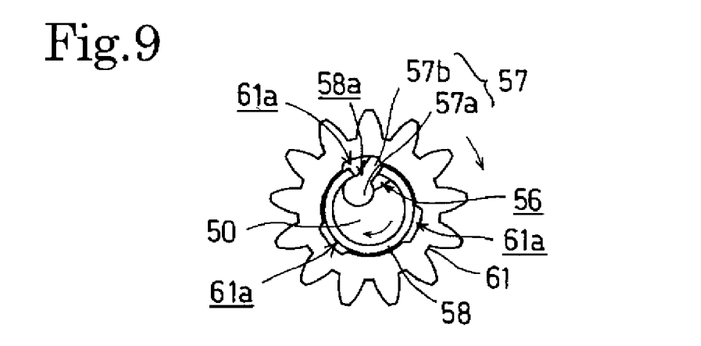
FIG. 9 is a sectional view taken along line IX-IX of FIG. 8.

The structure of the two-way or bi-directional clutch 55 provided between the driving shaft 50 and the driving gear 61 will be described with regard to the right end of the driving shaft 50 shown in FIGS. 8 to 10.

Further, the structure of a left bi-directional clutch 55 is symmetric with that of a right bi-directional clutch 55, and the structures of left and right bi-directional clutches 55 and 55 are the same.

A sleeve housing 51 is fitted to each bearing portion 2r of the blade housing 2 so that a central axis of the sleeve housing is oriented in the right-and-left direction, and the driving shaft 50 is rotatably supported by the sleeve housing 51 with a bearing 52 interposed therebetween.

A snap ring 53a is fitted close to the bearing 52 to the end portion of the driving shaft 50, and a flat hoop 53b is superimposed on the snap ring 53a so that the snap ring 53a comes in contact with the flat hoop 53b. After that, a cylindrical collar 58 is idly rotatably fitted to the driving shaft 50, and the driving gear 61 is then fitted to the driving shaft 50 so as to freely rotate with respect to the driving shaft 50. The axial position of the driving gear 61 is determined by a snap ring 54a, which is fitted to the end portion of the driving shaft 50 together with a flat hoop 54b interposed between the driving gear 50 and the snap ring 54a.

Further, a seal member 59, which provides friction for limiting the rotation of the collar 58 together with the driving shaft 50, is provided between the sleeve housing 51 and the collar 58.

An enlarged inner diameter portion, into which a part of the right side of the collar 58 is rotatably fitted, is formed on the side of the driving gear 61 facing the collar 58. The enlarged inner diameter portion is formed coaxially with a central hole of the driving gear 61, into which the driving shaft 50 is inserted. An axial notch 58a is formed at the portion of the collar 58 inserted into the enlarged inner diameter portion of the driving gear 61. In addition, three locking grooves 61a are formed in the inner peripheral surface of the enlarged inner diameter portion of the driving gear 61. The locking grooves 61a are formed at regular intervals in a circumferential direction of the enlarged inner diameter portion.

A clutch piece groove 56 is cut and formed in an axial direction at the end portion of the driving shaft 50 between the flat hoops 53b and 54b. The clutch piece groove 56 is at an eccentric position of the driving shaft 50 and is in the form of an axial circular hole a part of which is open to the outside. A swing clutch piece 57 having a keyhole-shaped cross-section is composed of a cylindrical column 57a extending in the axial direction of the driving shaft 50 and a protrusion 57b protruding radially outward from the cylindrical column 57a. The cylindrical column 57a is fitted in the circular hole of the clutch piece groove 56, and the protrusion 57b protrudes toward the outside in a radial direction so as to be swingable in the opening of the clutch piece groove 56.

The swing clutch piece 57 is disposed in the enlarged inner diameter portion of the driving gear 61 in the axial direction and is in the collar 58. However, the protrusion 57b of the swing clutch piece 57 protrudes toward the outside in the radial direction through the notch 58a, which is formed in the collar 58.

The two-way or bi-directional clutch 55 has the above-mentioned structure. When the driving shaft 50 rotates in the direction indicated by an arrow in FIG. 9 due to the driving of the travel DC motor 30, the collar 58 of which rotation is limited by the seal member 59 rotates with delay. For this reason, the protrusion 57b of the swing clutch piece 57 is caused to stand up (swings in a counterclockwise direction in FIG. 9), and the end of the protrusion 57b is engaged into one of the locking grooves 61a formed in the inner peripheral surface of the enlarged inner diameter portion of the driving gear 61. Since the bi-directional clutch 55 is in the engaged state and the driving gear 61 rotates, the rear wheel 7 rotates due to the engagement between the driving gear 61 and the driven gear 62. As a result, the lawn mower 1 can travel.

Figure 10:
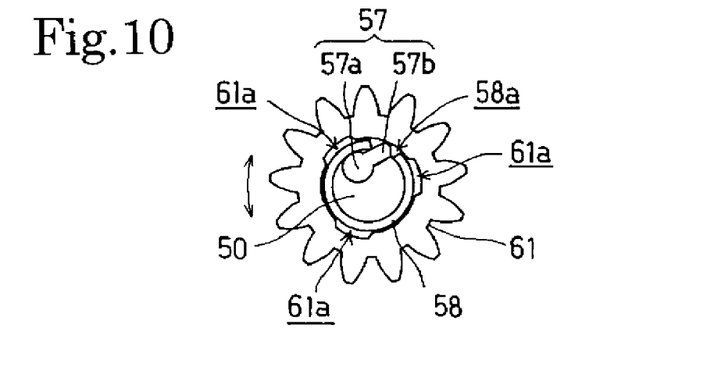
FIG. 10 is a sectional view showing another state of the bi-directional clutch in the same section as FIG. 9.

In the state shown in FIG. 10, the protrusion 57b of the swing clutch piece 57 falls down and is not in engagement with the locking groove 61a. In this state, the bi-directional clutch 55 is in a disengaged state. In this state, even if the driving gear 61 rotates in any of two directions, that is, in forward or backward direction due to the pushing or pulling of the lawn mower 1, the protrusion 57b of the swing clutch piece 57 is maintained in the falling-down state by the collar 58, whose delayed rotation with respect to the rotation of the driving gear 61 is limited, if the driving shaft 50 is fixed and is not driven in rotation. Accordingly, the protrusion 57b is not engaged with the locking groove 61a, and power is not transmitted from the driving gear 61 to the driving shaft 50. As a result, the driving gear 61 idles.

Figure 12:
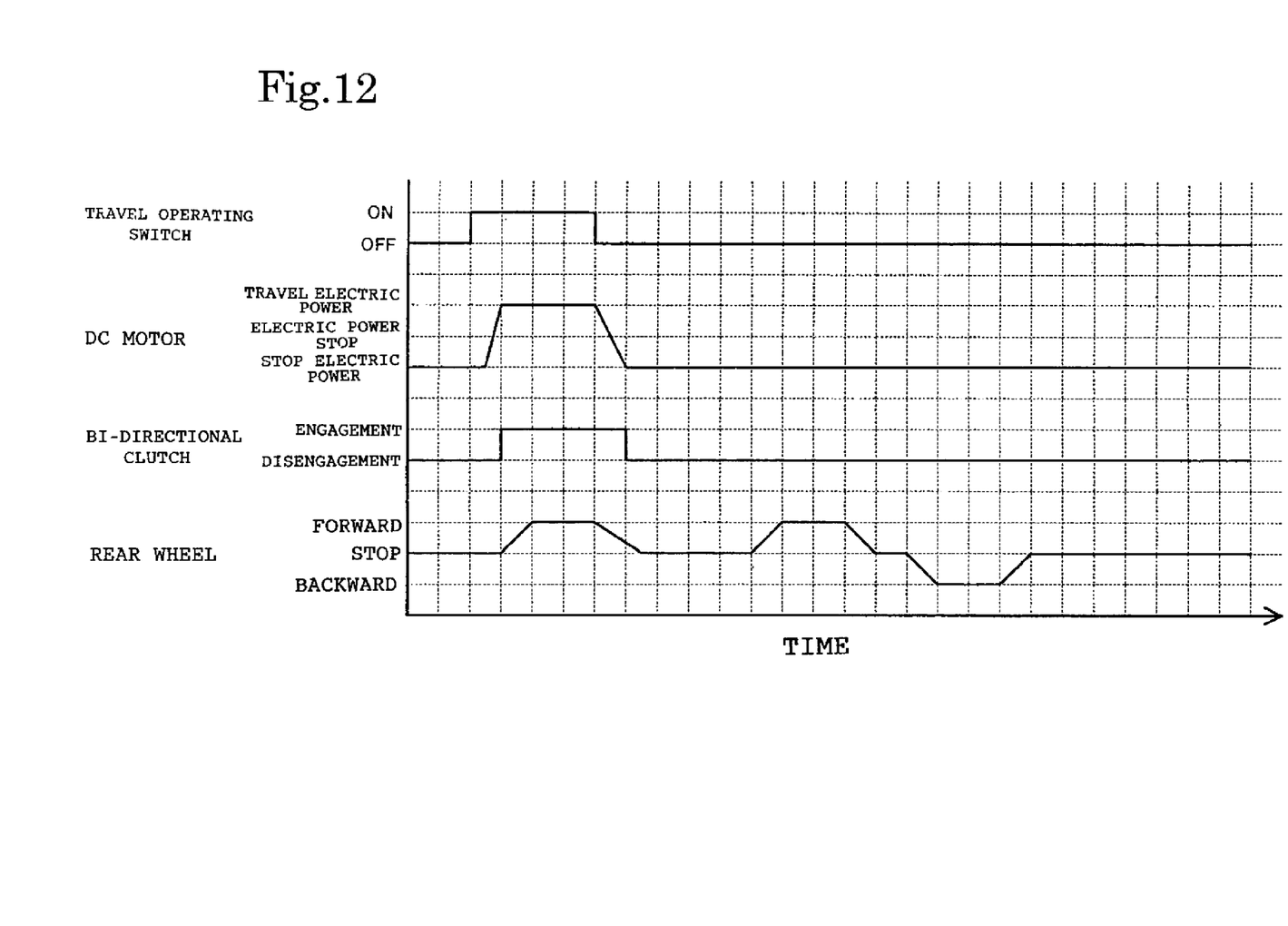
FIG. 12 is a timing chart of the drive control of rear wheels that is performed through the operation of a travel lever, and the pushing or pulling of the lawn mower that is performed by the operator.

FIG. 12 shows a timing chart of the drive control of the rear wheel 7 that is performed through the operation of a travel lever 86, and the pushing or pulling of the lawn mower 1 that is performed by the operator.

When a travel operating switch 86s is turned on by the travel instructing operation of the travel lever 86, travel electric power is supplied to the travel DC motor 30, so that the driving shaft 50 rotates. As shown in FIG. 9, the protrusion 57b of the swing clutch piece 57 stands up and is engaged with one locking groove 61a. Therefore, the bi-directional clutch 55 is in the engaged state, and the rear wheel 7 rotates in the forward direction. As a result, the lawn mower 1 travels forward.

When the travel operating switch 86s is turned off by the stop instructing operation of the travel lever 86, stop electric power is supplied to the travel DC motor 30, so that the travel DC motor 30 stops due to a short-circuit. Accordingly, the driving shaft 50 stops in a state in which the rotation thereof is limited. "Stop electric power is supplied to a motor, so that the motor stops due to a short-circuit. The term "short-circuit" means, for example, short-circuit braking (short-circuit stop) in which terminals of the motor are forcibly short-circuited to obtain strong braking effect. According to the invention, a short circuit is provided between the terminals of the travel DC motor 30. Accordingly, when the travel operating switch 86s is turned off, the ECU 70 performs a control operation so that the short circuit is operated.

As a result of the short-circuit stop of the motor 30, the driving gear 61 rotates around the driving shaft 50, which has stopped due to the short-circuit, until the rear wheel 7 stops after rotating due to inertia after the driving shaft 50 is stopped. The locking groove 61a is turned in the same direction due to the rotation of the driving gear 61, and the collar 58 is also turned. For this reason, as shown in FIG. 10, the protrusion 57b of the swing clutch piece 57 falls down and is pulled out of the locking groove 61a, so that the bi-directional clutch 55 is brought into the disengaged state with reliability. As a result, the lawn mower 1 stops while the bi-directional clutch 55 is in the disengaged state.

While the travel DC motor 30 stops with the short-circuit and the bi-directional clutch 55 is in the disengaged state, the lawn mower 1 stops. For this reason, when the operator pushes the lawn mower 1 forward, the rear wheel 7 rotates in the forward direction and the driving gear 61 also rotates in the forward direction together with the rear wheel 7. As understood from FIG. 10, the bi-directional clutch 55 is not engaged by nature with respect to the rotation of the driving gear 61 in the forward direction. For this reason, the driving gear 61 idles, so that the operator can easily push the lawn mower 1.

Even when the operator pulls the stopping lawn mower 1 rearward, the rear wheel 7 rotates in the backward direction and the driving gear 61 also rotates in the backward direction together with the rear wheel 7. However, in the state shown in FIG. 10, the protrusion 57b of the swing clutch piece 57 limits the delayed rotation of the collar 58 with respect to the rotation of the driving gear 61 by the driving shaft 50 of which rotation is limited. Further, since the protrusion 57b of the swing clutch piece 57 is maintained in the falling-down state by the collar 58 of which delayed rotation with respect to the rotation of the driving gear 61 is limited, the bi-directional clutch 55 is not engaged. For this reason, the driving gear 61 idles, so that the operator can easily pull the lawn mower 1.

As described above, when the lawn mower 1 stops traveling, the engagement of the bi-directional clutch 55 is reliably released so as to be in the disengaged state. After that, when the operator pulls or pushes the lawn mower 1, the bi-directional clutch 55 is maintained in the disengaged state and the driving gear 61 idles in both directions. For this reason, the operator can easily push and pull the lawn mower 1.

In addition, since the driving gear 61 idles in both directions, it is possible to easily change the direction of the lawn mower 1.

When the ECU 70 finally stops operation, electric power is not supplied to the travel DC motor 30.

A hybrid self-propelled lawn mower, which performs the mowing operation by using the internal combustion engine and travels by using an electric motor, has been described as an embodiment. However, the invention may be applied to a self-propelled lawn mower, which performs the mowing operation by using an electric motor and also travels by using an electric motor.

What is claimed is:

1. A travel-driving mechanism for a self-propelled working machine, in which a driving wheel is rotated by using power of an electric motor for travel:
   wherein the mechanism comprises:
   a power transmission unit, including a bi-directional clutch, and being provided between the electric motor and the driving wheel;
   a driving shaft rotatably driven by the electric motor to rotate the driving wheel, the bi-directional clutch being provided between the driving shaft and the driving wheel; and
   a travel control unit that receives an instruction signal produced by operation of a travel operation means, which is operated by an operator, as input and controls the electric motor: and
   wherein the travel control unit is operable to cause a short-circuit stop of the electric motor while electric power is being supplied to the electric motor upon receiving a travel stop signal produced by operation of the travel operation means.

2. The travel-driving mechanism according to claim 1, wherein:
   the electric motor has a short circuit between terminals thereof, and
   the travel control unit is operated in response to the travel stop signal produced by the operation of the travel operation means to operate the short circuit.

3. A travel-driving mechanism for a self-propelled working machine, including a DC electric motor, driving wheels driven by the electric motor for travel of the working machine, a travel operation means operable by an operator, and a control unit that receives instruction signals from the travel operation means to control the electric motor, wherein said travel driving mechanism comprises:
   a power transmission unit disposed between the DC electric motor and each of the driving wheels, said power transmission unit including a bi-directional clutch, wherein
   said DC electric motor having short circuit connecting terminals, and further wherein
   said control unit is configured to operate a short circuit between said short circuit connecting terminals, upon receiving a travel stop signal from the travel operation means, to thus cause a short circuit stop of the electric motor, while each of the driving wheels is rotating due to inertia, so as to bring the bi-directional clutch into disengaged state, whereby the operator can easily pull and push the working machine.

4. A travel-driving mechanism for a self-propelled working machine according to claim 3, wherein the working machine is a lawn mower.

* * * * *